US009417724B2

(12) United States Patent
Nishigaki

(10) Patent No.: US 9,417,724 B2
(45) Date of Patent: Aug. 16, 2016

(54) ELECTRONIC APPARATUS

(71) Applicant: KYOCERA Corporation, Kyoto (JP)

(72) Inventor: Atsuo Nishigaki, Moriguchi (JP)

(73) Assignee: Kyocera CORPORATION, Kyoto-Shi (JP)

( * ) Notice: Subject to any disclaimer, the term of this patent is extended or adjusted under 35 U.S.C. 154(b) by 72 days.

(21) Appl. No.: 14/582,991

(22) Filed: Dec. 24, 2014

(65) Prior Publication Data

US 2015/0109229 A1 Apr. 23, 2015

Related U.S. Application Data

(63) Continuation of application No. PCT/JP2013/067428, filed on Jun. 26, 2013.

(30) Foreign Application Priority Data

Jun. 26, 2012 (JP) ................................ 2012-143120

(51) Int. Cl.
*G06F 3/041* (2006.01)
*G06F 3/0485* (2013.01)
(Continued)

(52) U.S. Cl.
CPC ............ *G06F 3/0412* (2013.01); *G06F 3/0481* (2013.01); *G06F 3/0485* (2013.01); *G06F 3/04883* (2013.01); *G06F 2203/04808* (2013.01); *H04M 2250/22* (2013.01)

(58) Field of Classification Search
CPC . G06F 3/0485; G06F 3/04883; G06F 3/0488; G06F 2203/04808; G06F 2203/04806
See application file for complete search history.

(56) References Cited

U.S. PATENT DOCUMENTS

| | | | |
|---|---|---|---|
| 7,812,826 | B2 | 10/2010 | Ording et al. |
| 8,581,864 | B2 | 11/2013 | Miyazawa et al. |

(Continued)

FOREIGN PATENT DOCUMENTS

| | | | |
|---|---|---|---|
| JP | 2003-248536 | A | 9/2003 |
| JP | 2009-134307 | A | 6/2009 |

(Continued)

OTHER PUBLICATIONS

International Search Report dated for Jul. 16, 2013 issued for counterpart international application No. PCT/JP2013/067428, 2 pages.

(Continued)

*Primary Examiner* — Dwayne Bost
*Assistant Examiner* — Christopher Kohlman
(74) *Attorney, Agent, or Firm* — Procopio Cory Hargreaves and Savitch LLP

(57) ABSTRACT

An electronic apparatus includes a detection module configured to detect an operation for the electronic apparatus, and a process execution module configured to execute a process corresponding to an operation detected by the detection module. When the detection module detects a first operation, the process execution module executes a predetermined process corresponding to the first operation. The first operation comprises an operation in which a contact module moves in a state of touching a display surface of the electronic apparatus. When the detection module detects a second operation after detecting the first operation, the process execution module re-executes the predetermined process. The second operation comprises an operation of a contact module for the electronic apparatus without being accompanied by a movement of the contact module along a display surface.

14 Claims, 12 Drawing Sheets

(51) Int. Cl.
*G06F 3/0481* (2013.01)
*G06F 3/0488* (2013.01)

(56) References Cited

U.S. PATENT DOCUMENTS

| | | | | |
|---|---|---|---|---|
| 2011/0043527 | A1 | 2/2011 | Ording et al. | |
| 2012/0223891 | A1* | 9/2012 | Patterson | G06F 3/04883 345/173 |
| 2013/0241819 | A1* | 9/2013 | Yamashita | G06F 3/017 345/156 |
| 2014/0022214 | A1 | 1/2014 | Miyazawa et al. | |
| 2015/0212683 | A1* | 7/2015 | Arita | G09G 5/00 715/786 |

FOREIGN PATENT DOCUMENTS

| | | | |
|---|---|---|---|
| JP | 2009-522669 | A | 6/2009 |
| JP | 2011-150413 | A | 8/2011 |
| WO | 2007/079425 | A2 | 7/2007 |

OTHER PUBLICATIONS

Written Opinion dated Jul. 6, 2013 issued for counterpart international application No. PCT/JP2013/067428, 4 pages.

Statement of Relevance for Written Opinion dated Jul. 6, 2013 issued for counterpart international application No. PCT/JP2013/067428, 2 pages.

* cited by examiner

F I G. 4
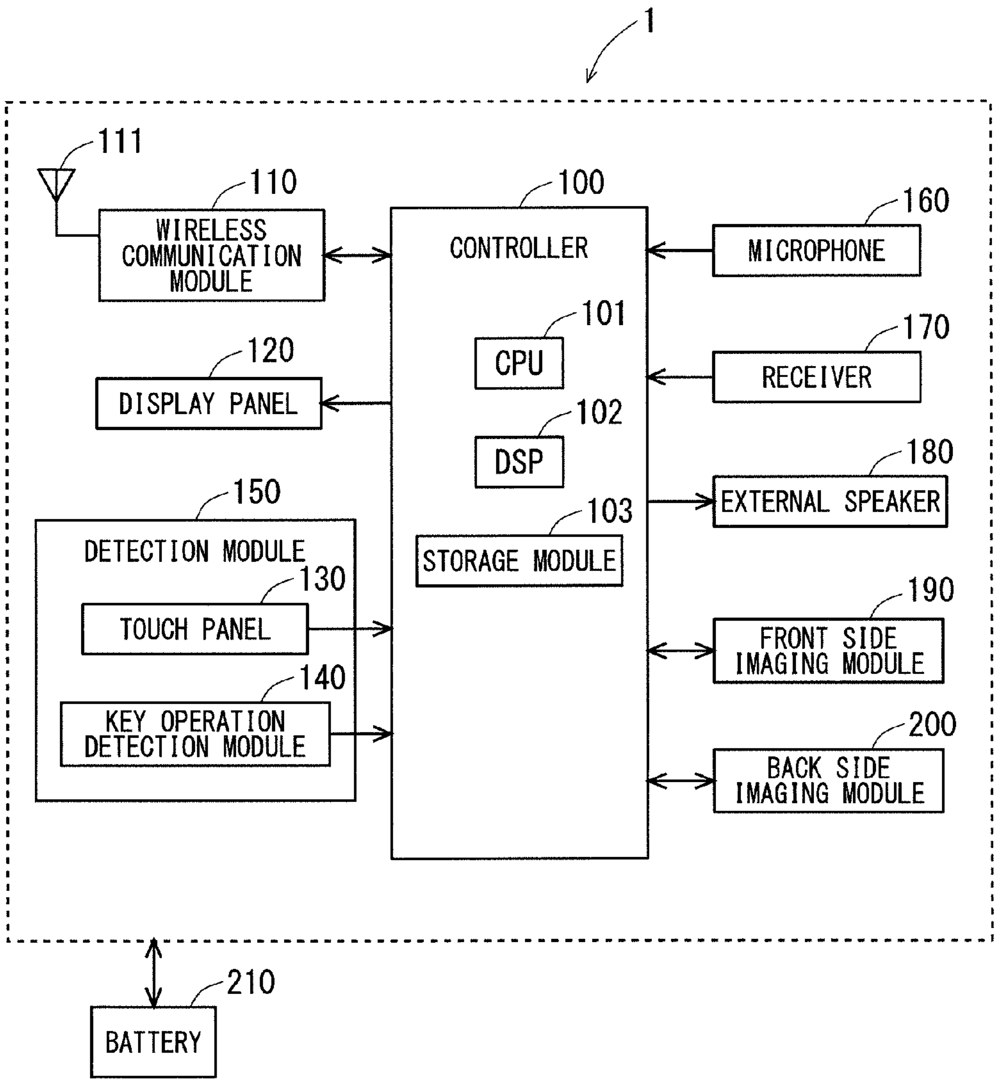

F I G. 5
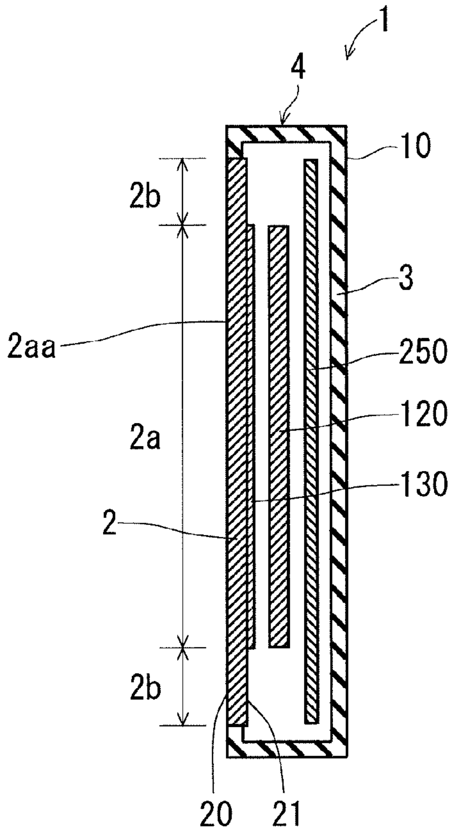
F I G. 6
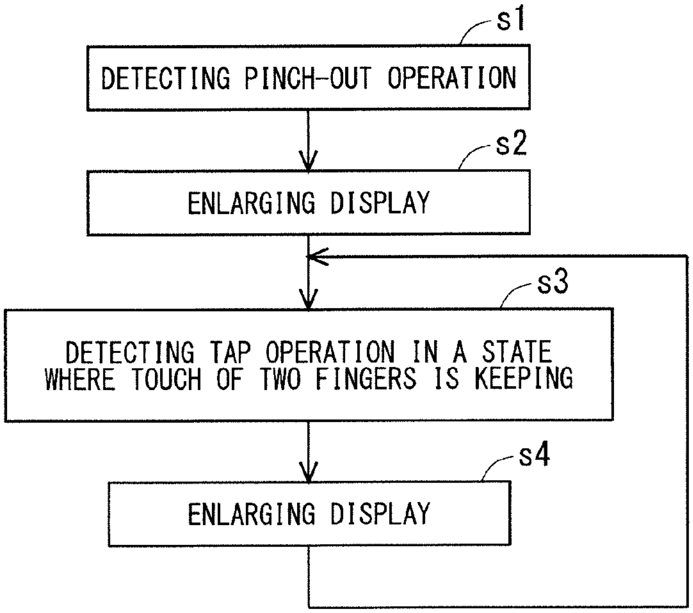

F I G . 9
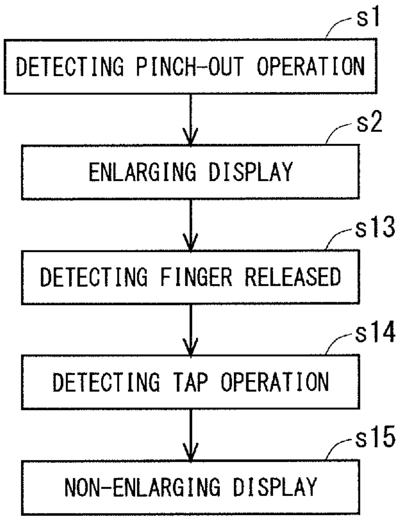
F I G . 1 0
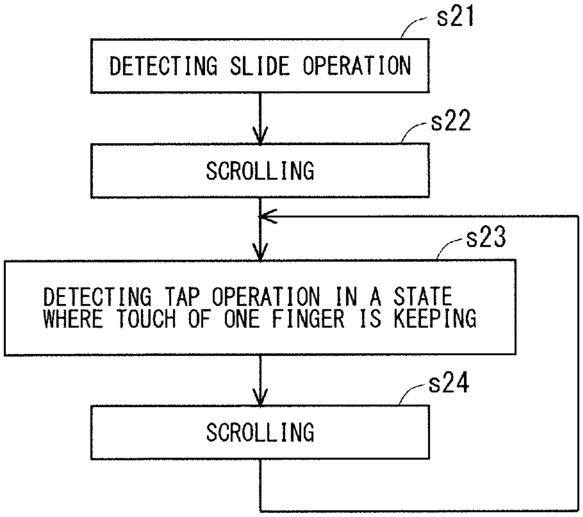

F I G . 1 7
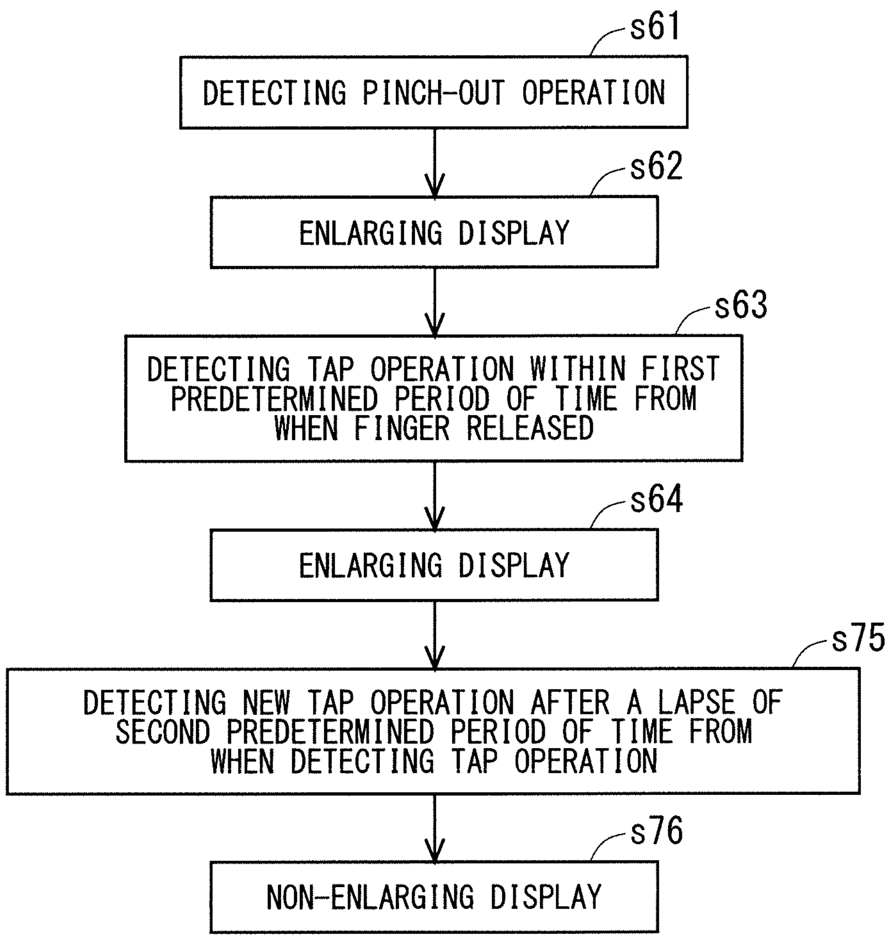

ELECTRONIC APPARATUS

The present application is a continuation application based on PCT Application No. PCT/JP2013/067428, filed on Jun. 26, 2013, which claims the benefit of Japanese Application No. 2012-143120, filed on Jun. 26, 2012. PCT Application No. PCT/JP2013/067428 and Japanese Application No. 2012-143120 are entitled "ELECTRONIC APPARATUS". The contents of which are incorporated by reference herein in their entirety.

TECHNICAL FIELD

Embodiments of the present disclosure relate to an electronic apparatus.

BACKGROUND ART

Various technologies have conventionally been proposed for electronic apparatuses.

SUMMARY

An electronic apparatus is disclosed. A detection module is configured to detect an operation for the electronic apparatus. A process execution module is configured to execute a process corresponding to an operation detected by the detection module. When the detection module detects a first operation in which a contact module moves in a state of touching a display surface of the electronic apparatus, the process execution module executes a predetermined process corresponding to the first operation. When the detection module detects a second operation of a contact module for the electronic apparatus without being accompanied by a movement of the contact module along a surface of the electronic apparatus after detecting the first operation, the process execution module re-executes the predetermined process.

BRIEF DESCRIPTION OF DRAWINGS

FIG. 4 illustrates a block diagram illustrating an electrical configuration of the electronic apparatus.

FIG. 5 illustrates a view showing as cross-sectional structure in a vertical direction of the electronic apparatus.

FIG. 6 illustrates a flow chart illustrating an operation of the electronic apparatus.

FIG. 9 illustrates a flow chart illustrating an operation of the electronic apparatus.

FIG. 10 illustrates a flow chart illustrating an operation of the electronic apparatus.

FIG. 17 illustrates a flow chart illustrating an operation of the electronic apparatus.

DESCRIPTION OF EMBODIMENTS

<Appearance of the Electronic Apparatus>

Figure 1:
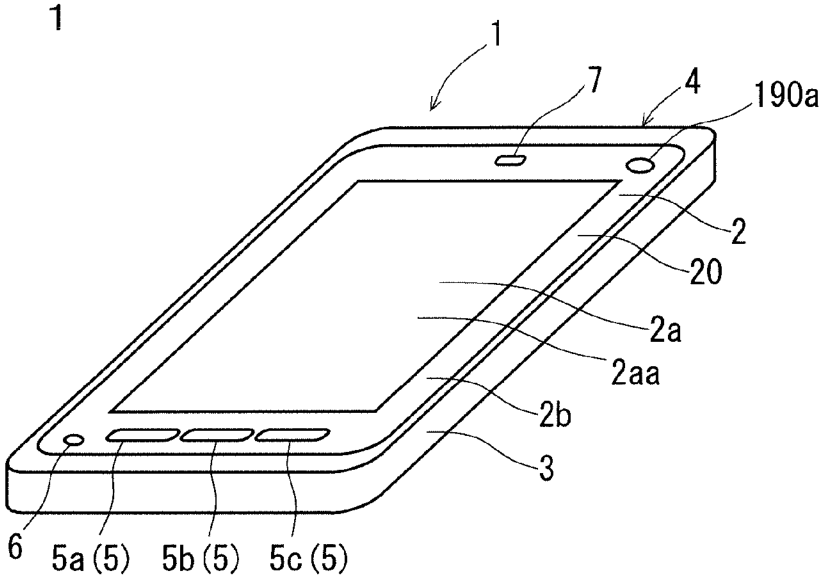
FIG. 1 illustrates a perspective view showing an appearance of an electronic apparatus.
Figure 2:
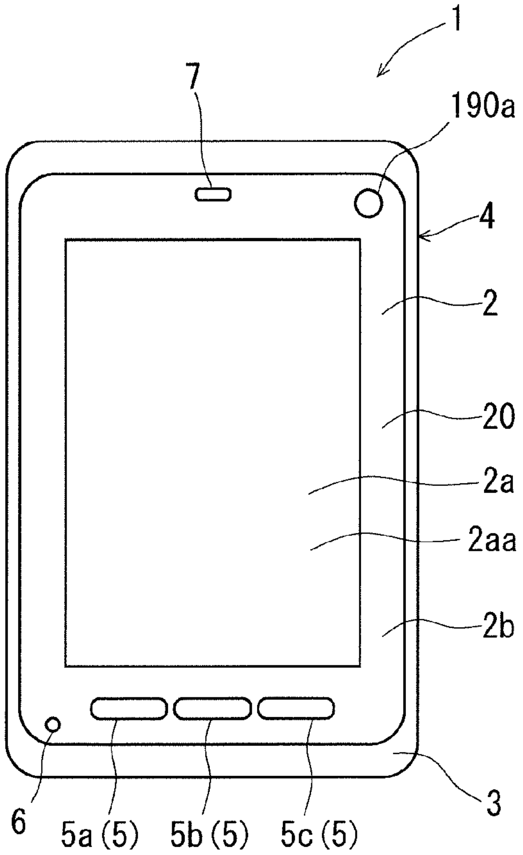
FIG. 2 illustrates a front view showing the appearance of the electronic apparatus.
Figure 3:
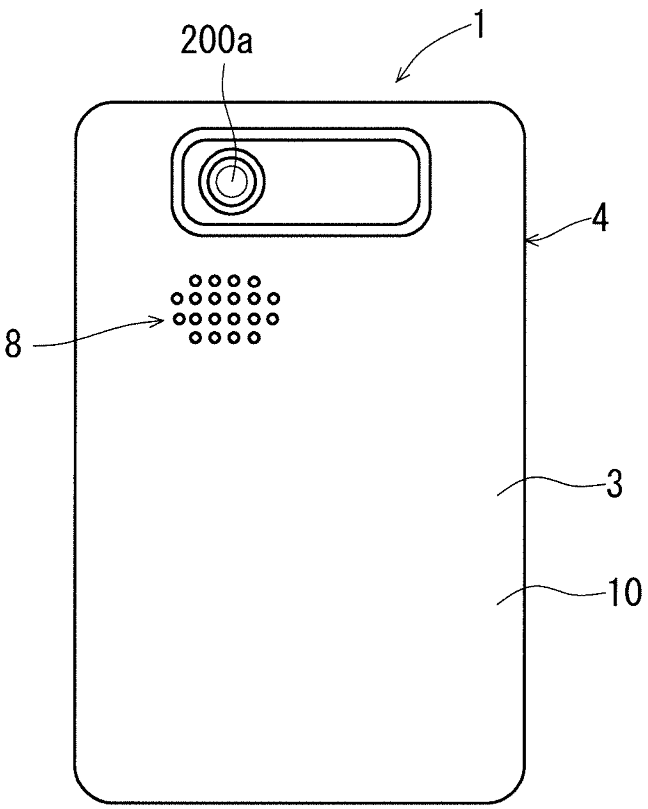
FIG. 3 illustrates a back view showing the appearance of the electronic apparatus.

FIGS. 1 to 3 are respectively a perspective view, a front view, and a back view showing the appearance of an electronic apparatus 1 according to a preferred embodiment, respectively. The electronic apparatus 1 is for example, a mobile phone. As shown in FIGS. 1 to 3, the electronic apparatus 1 includes a cover panel 2 and a case portion 3. By combining the cover panel 2 and the case portion 3, an apparatus case 4 forming a substantially rectangular plate shape in a plan view is configured.

The cover panel 2 has a substantially rectangular shape in a plan view. The cover panel 2 includes a portion other than the peripheral portion in the front portion of the electronic apparatus 1. The cover panel 2 is formed by, for example, transparent glass or a transparent acrylic resin. The case portion 3 includes the peripheral portion of the font portion, the back portion and the side portion of the electronic apparatus 1. The case portion 3 is formed by, for example, a polycarbonate resin.

In the cover panel 2, a display portion 2*a* having a display surface 2*aa* on which various kinds of information such as characters, symbols, and figures are displayed is disposed. The display portion 2*a* has, for example, a rectangular shape in a plan view. The front face of the display portion 2*a* is the display surface 2*aa*. The peripheral portion 2*b* surrounding the display portion 2*a* in the cover panel 2 has, for example, a black color by a film and the like being adhered thereto. Thus, the peripheral portion 2*b* is in a non-display portion where information is not displayed. On the inner main face of the cover panel 2, a touch panel 130, which will be described below, is adhered. Thus, a user can give various kinds of instructions to the electronic apparatus 1 by operating the display surface 2*aa* on the front face of the electronic apparatus 1 with a finger and the like.

The inside of the apparatus case 4 includes the first operation key 5*a*, the second operation key 5*b*, and the third operation key 5*c*. Each of the first operation key 5*a*, the second operation key 5*b*, and the third operation key 5*c* is a hardware key, and the front face of each of them is exposed from the lower side end portion of the outer main face 20 of the cover panel 2. Hereinafter, each of the first operation key 5*a*, the second operation key 5*b*, and the third operation key 5*c* is referred to as the "operation key 5" if they are not necessary to be particularly distinguished. The user can give instructions to the electronic apparatus 1 also by operating the operation key 5 with a finger and the like.

It should be noted that, in the following, the case in which the user operates the display surface 2*aa* and the operation keys 5 of the electronic apparatus 1 with a finger will be mainly described, but the operation on the electronic apparatus 1 is not limited to the operation with a finger. The user may operate the electronic apparatus 1 with a contact module other than a finger, instead of a finger or in combination with a finger. For example, the user may operate the electronic apparatus 1 with an electrostatic type touch panel pen such as a stylus pen.

A microphone hole 6 is opened in the lower side end portion of the cover panel 2. A receiver hole 7 is opened in the upper side end portion of the cover panel 2. From the upper side end portion of the outer main face 20 of the cover panel 2, an imaging lens 190*a* which a below-described front side imaging module 190 includes is visible. In addition, as shown in FIG. 3, in a back face 10 of the electronic apparatus 1, in other words, a back face of the apparatus case 4, speaker holes 8 are opened. And, from the back face 10 of the electronic apparatus 1, an imaging lens 200*a* winch a below-described back side imaging module 200 includes is visible.

<Electrical Configuration of the Electronic Apparatus>

FIG. 4 is a block diagram illustrating an electrical configuration of the electronic apparatus 1. As shown in FIG. 4, in the electronic apparatus 1, a controller 100, a wireless communication module 110, a display panel 120, and a detection module 150 are disposed. Furthermore, in the electronic apparatus 1, a microphone 160, a receiver 170, an outside speaker 180, the front side imaging module 190, the back side imaging module 200, and a battery 210 are disposed. These components disposed in the electronic apparatus 1 are housed in the apparatus case 4.

The controller 100 comprehensively manages the operation of the electronic apparatus 1 by controlling the other components of the electronic apparatus 1. The controller 100 includes a CPU (Central Processing Unit) 101, a DSP (Digital Signal Processor) 102 and a storage module 103.

The storage module 103 includes a non-transitory recording medium which the controller 100 (the CPU 101 and the DSP 102) can read such as a ROM (Read Only Memory) and a RAM (Random Access Memory). As illustrated in FIG. 4, in the storage module 103, a main program being a control program for controlling the electronic apparatus 1, specifically for controlling each component such as the wireless communication module 110 and the display panel 120 included by the electronic apparatus 1, and a plurality of application programs and the like are stored. Various kinds of functions of the controller 100 ate achieved by the CPU 101 and the DSP 102 executing the various kinds of programs in the storage module 103.

It should be noted that the storage module 103 may include a non-transitory recording medium ethic a computer can read other than the ROM and the RAM. The storage module 103 may include, for example, a small hard disk drive and a SSD (Solid State Drive).

The wireless communication module 110 includes an antenna 111. The wireless communication module 110 receives a signal from a mobile phone other than the electronic apparatus 1 or a communication apparatus such as a web server connected to the Internet by the antenna 111 via a base station. The wireless communication module 110 performs amplification process and down-conversion on the received signal to output to the controller 100. The controller 100 performs demodulation process and the like on the input received signal, and thereby, obtains a sound signal and the like indicating voice and music and the like included in the received signal. In addition, the wireless communication module 110 performs up-conversion and amplification process on a transmission signal including a sound signal or the like that generated by the controller 100, and thereby, wirelessly transmits the processed transmission signal from the antenna. 111. The transmission signal from the antenna 111 is received by a mobile phone other than the electronic apparatus 1 or a communication apparatus connected to the Internet through the base station.

The display panel 120 is, for example, a liquid crystal display panel or an organic EL panel. The display panel 120 displays various kinds of information such as characters, symbols, and figures controlled by the controller 100. The information displayed on the display panel 120 is displayed on the display surface 2*aa* of the display portion 2*a* of the cover panel 2, and thereby, the information is made visible to the user of the electronic apparatus 1.

The detection module 150 detects the operation of the user to the electronic apparatus 1. The detection module 150 includes a touch panel 130 that detect a user's operation of the display surface 2*aa* of the cover panel 2, and a key operation detection module 140 to detect a user's operation of each of the operation keys 5.

The touch panel 130 is, for example, a touch panel of the projection-type electrostatic capacity system. The touch panel 130 is attached to the inner main face of the cover panel 2, and includes two sheet-like electrode sensors disposed opposite to each other. The two electrode sensors are bonded together by a transparent adhesive sheet.

In one electrode sensor, a plurality of elongate X electrodes each of which extends along the X-axis direction (horizontal direction of the electronic apparatus 1, for example) and is disposed parallel to each other are formed. In the other electrode sensor, a plurality of elongate Y electrodes each of which extends along the Y-axis direction (vertical direction of the electronic apparatus 1, for example) and is disposed parallel to each other are formed. When a finger and the like of the user touches the display surface 2*aa,* the electrostatic capacitance between the X and Y electrodes under the touch area changes. Thereby, in the touch panel 130, the finger operation on the display surface 2*aa* of the cover panel 2 is detected. The electrostatic capacitance change occurring in the touch panel 130 between the X and Y electrodes is transmitted to the controller 100. The controller 100 identifies the contents of the operation performed on the display surface 2*aa* of the cover panel 2 based on the change in electrostatic capacitance, and performs a process accordingly.

For each of the plurality of operation keys 5, the key operation detection module 140 detects whether the corresponding operation key 5 is pressed (operated) or not. For each of the plurality of operation keys 5, when the corresponding operation key 5 is not pressed, the key operation detection module 140 outputs the non-operation signal indicating that the corresponding operation key 5 is not operated to the controller 100. In addition, for each of the plurality of operation keys 5, when the corresponding operation key 5 is pressed, the key operation detection module 140 outputs the operation signal indicating that the corresponding operation key 5 is operated to the controller 100. Thereby, for each of the operation keys 5, the controller 100 can determine whether the corresponding operation key 5 is operated or not.

When it is detected by the key operation detection module 140 that the user touches the first operation key 5*a* with a finger and pushes down the first operation key 5*a* with the finger, and subsequently it is detected by the key operation detection module 140 that the user releases the finger from the first operation key 5*a* and that the first operation key 5*a* is no longer pushed down with the user's finger, the controller 100 controls the display panel 120 and returns the display on the display surface 2*aa* to the previous one. That is, when an operation signal relating to the first operation key 5*a* is input, and then a non-operation signal relating to the first operation key 5*a* is input from the key operation detection module 140, the controller 100 controls the display panel 120 and returns the display on the display surface 2*aa* to the previous one.

In addition, when it is detected by the key operation detection module 140 that the user touches the second operation key 5*b* with a finger and pushes down the second operation key 5*b* with the finger, and subsequently it is detected by the key operation detection module 140 that the user releases the finger from the second operation key 5*b* and that the second operation key 5*b* is no longer pushed down with the user's finger, the controller 100 councils the display panel 120 and displays the home screen (initial screen) on the display suffice 2*aa*.

In addition, when it is detected by the key operation detection module 140 that the user touches the third operation key 5*c* with a finger and pushes don the third operation key 5*c* with the finger, and subsequently it is detected by the key operation detection module 140 that the user releases the finger from the third operation key 5*c* and that the third operation key 5*c* is no longer pushed down with the user's finger, the controller 100 controls the displays panel 120 and displays the option menu on the display surface 2*aa*.

Thus, the controller 100 functions as the process execution module that execute a process according to the operation detected by the detection module 150 on the electronic apparatus 1.

The microphone 160 converts the sound input from outside of the electronic apparatus 1 to an electrical sound signal and outputs the electrical sound signal to the controller 100. Sound from the outside of the electronic apparatus 1 is taken into the inside of the electronic apparatus 1 from the microphone hole 6 disposed on the from face of the cover panel 2 and is input to the microphone 160.

The external speaker 180 is, for example, a dynamic speaker. The external speaker 180 converts an electrical sound signal from he controller 100 to sound and outputs the sound. The sound output from the external speaker 180 is output to the outside from the speaker holes 8 disposed on the back face 10 of the electronic apparatus 1. The sound output horn the speaker holes 8 is made so as to be heard even in places away from the electronic apparatus 1.

The front side imaging module 190 includes an imaging lens 190*a*, an imaging element, and the like. The front side imaging module 190 captures a still image and a moving image based on the control by the controller 100. As shown in FIGS. 1 and 2, the imaging lens 190*a* is disposed on the front face of the electronic apparatus 1. Therefore, the front side imaging module 190 can image art object existing on the front side (cover panel 2 side) of the electronic apparatus 1.

The back side imaging module 200 includes an imaging lens 200*a*, an imaging element, and the like. The back side imaging module 200 captures a still image and a moving image based on the control by the controller 100. As shown in FIG. 3, the imaging lens 200*a* is disposed on the back face 10 of the electronic apparatus 1. Thus, the back side imaging module 200 can image an object existing on the side of the back face 10 of the electronic apparatus 1.

The receiver 170 outputs the received sound. The receiver 170 includes, for example, a dynamic speaker. The receiver 170 converts an electrical sound signal from the controller 100 to sound and outputs the sound. The sound output from the receiver 170 is output to the outside from the receiver hole 7 disposed on the front face of the electronic apparatus 1. The volume of the sound output from the receiver hole 7 is made smaller than the volume of the sound output from the speaker holes 8.

The battery 210 outputs the power for the electronic apparatus 1. The power output from the battery 210 is supplied to each of the electronic components contained in the controller 100 and the wireless communication module 110 and the like included in the electronic apparatus 1.

In the storage module 103, various application programs (hereinafter referred to as "applications") are stored. In the storage module 103, for example, a voice call application configured to make voice calls, a videophone application configured to perform a video phone communication, a browser configured to display a web site, and an email application configured to perform writing, viewing, and transmitting and receiving email are stored. In addition, in the storage module 103, an application configured to display the still image data stored in it, a music reproducing application configured to reproduce music data stored in the storage module 103, a map display application configured to display a map, an electronic book application configured to display electronic books and the like are stored.

When the controller 100 running the main program in the storage module 103 reads and executes the application in the storage module 103, the controller 100 controls the other components of the electronic apparatus 1 such as the wireless communication module 110, the display panel 120 and the receiver 170. Thereby, the function (process) corresponding to the application is run in the electronic apparatus 1. For example, the controller 100 running the voice call application controls the wireless communication module 110, the microphone 160 and the receiver 170. Thereby, in the electronic apparatus 1, the voice included in the received signal received by the wireless communication module 110 is output from the receiver 170, and the transmission signal including the voice input to the microphone 160 is transmitted from the wireless communication module 110, and thereby, voice communication is performed between the communication partner apparatuses.

<Internal Structure of the Electronic Apparatus>

FIG. 5 is a diagram showing a cross-sectional structure in the vertical direction (longitudinal direction) of the electronic apparatus 1. As shown in FIG. 5, the touch panel 130 is adhered to the inner main face 21 of the cover panel 2 so as to face the display portion 2*a* of the cover panel 2. And, the display panel 120 being as display module is disposed so as to face the cover panel 2 and the touch panel 130. Therefore, the touch panel 130 is disposed between the cover panel 2 and the display panel 120. In the cover panel the portion facing the display panel 120 is the display portion 2*a*.

In addition, in the inside of the apparatus case 4, a printed circuit board 250 on which various kinds of components such as the CPU 101 and the DSP 102 are mounted is disposed. The pruned circuit board 250 is disposed so as to face the display panel 120 on the side closer to the back face 10 of the electronic apparatus 1 than the display panel 120.

<Types of Operations on the Display Surface>

In the electronic apparatus 1 according to this embodiment, when the touch panel 130 of the detection module 150 detects an operation on the display surface 2*aa*, the controller 100 performs a process corresponding to the operation. Some of the contents of the processes executed by the controller 100 according to the operation on the display surface 2*aa* may vary even in the identical operation on the display surface 2*aa* depending on the operating state of the electronic apparatus 1, for example, the application executed on the electronic apparatus 1.

The operations on the display surface 2*aa* of the electronic apparatus 1 include the slide operation, the tap operation, the flick operation, the pinch operation, and the rotation operation. The slide operation, the flick operation, the pinch operation and the rotation operation are the operations involving the movement of a finger along the display surface 2*aa*.

The term "slide operation" means an operation in which one finger moves in the state of touching the display surface 2*aa*. The use can, for example, scroll the display of the display surface 2*aa* and turn pages displayed on the display surface 2*aa* by performing the slide operation on the display surface 2*aa*.

The term "tap operation" means an operation in which one finger touches the display surface 2*aa*, and then is immediately released from the display surface 2*aa*. In detail, the tap operation is an operation in which one finger touches the display surface 2*aa*, and is released from the display surface 2*aa* at the touched position within the predetermined period of time. Therefore, in the tap operation, the finger does not move along the front face of the electronic apparatus 1. By performing the tap operation on the display surface 2*aa*, the user can, for example, select the icon, for executing application, displayed on the display surface 2*aa*, and perform the execution of the application.

The term "flick operation" means an operation of sweeping the display surface 2*aa* with one finger. In detail, the flick operation is an operation in which the period from when one finger touches the display surface 2*aa* to when the finger leaves the display surface 2*aa* is within the predetermined period of time, and in which the finger moves more than or equal to the predetermined distance from where the finger touches the display surface 2*aa* to where the finger leaves the display surface 2*aa*. By performing the flick operation on the display surface 2*aa*, the user can, for example, scroll the display of the display surface 2*aa* in the direction of the flick operation, and turn the pages displayed on the display surface 2*aa*.

The pinch operation includes two types of operations: a pinch-out operation, and a pinch-in operation. The term "pinch-out operation" means an operation in which the two fingers move away from each other (are opened) in the state where the two fingers touch on the display surface 2*aa*. On the other hand, the term "pinch-in operation" means an operation in which the two fingers come close to each other (are closed) in the state where the two fingers touch on the display surface 2*aa*. By performing the pinch-out operation on the display surface 2*aa*, the user can, for example, enlarge the display of the display surface 2*aa*. In addition, by performing the pinch-in operation on the display surface 2*aa*, the user can, for example, reduce the display of the display surface 2*aa*.

The term "rotation operation" means an operation in which the two fingers rotate in the state where the two fingers touch on the display surface 2*aa*. By performing the rotation operation on the display surface 2*aa*, the user can, for example, rotate the display of the display surface 2*aa*.

<On Re-Execution of the Process Corresponding to the Operation on the Display Surface>

In the electronic apparatus 1 according to this embodiment, by the controller 100 executing the map display application in the storage module 103, when the map is displayed on the display surface 2*aa* of the cover panel 2, the user can significantly enlarge the map on the display surface 2*aa* by repeatedly executing the pinch-out operation on the display surface 2*aa*. In addition, the user can significantly reduce the map on the display surface 2*aa* by repeatedly executing the pinch-in operation on the display surface 2*aa*.

When the user performs the pinch-out operation on the display surface 2*aa*, the map displayed on the display surface 2*aa* is enlarged by the controller 100 controlling the display panel 120. In this case, the map displayed on the display surface 2*aa* is enlarged at a magnification corresponding to the increased amount of the distance between the two fingers before and after performing the pinch-out operation. Specifically, for example, against the two points of Tokyo and Osaka of the Japanese map displayed on the display surface 2*aa*, when the user increases the distance between the two fingers in the state where the two fingers touch the respective two points, the Japanese map of the display surface 2*aa* is enlarged so that Tokyo and Osaka are positioned in the respective two points where the two fingers touch after the distance is increased. In addition, when the user performs the pinch-out operation further on the display surface 2*aa*, by the controller 100 controlling the display panel 120, the map displayed on the display surface 2*aa* is further enlarged at as much as the magnification corresponding to the increased amount of the distance between the two fingers before and after performing the pinch-out operation.

In addition, when the map is displayed on the display surface 2*aa*, and when the user performs the pinch-in operation on the display surface 2*aa*, the map displayed on the display surface 2*aa* is reduced by the controller 100 controlling the display panel 120. In this case, the map displayed on the display surface 2*aa* is reduced at a magnification corresponding to the reduced amount of the distance between the two fingers before and after performing the pinch-in operation. For example, against the two points of Hokkaido and Okinawa of the Japanese map displayed on the display surface 2*aa*, when the user reduces the distance between the two fingers in the state where the two fingers touch the respective two points, the Japanese map of the display surface 2*aa* is reduced so that Hokkaido and Okinawa are positioned in the respective two points where the two fingers touch after the distance is reduced. And, when the user performs the pinch-in operation further on the display surface 2*aa*, by the controller 100 controlling the display panel 120, the map displayed on the display surface 2*aa* is further reduced just at a magnification corresponding to the reduced amount of the distance between the two fingers before and after performing the pinch-in operation.

In addition, when the map is displayed on the display surface 2*aa*, and when the user performs the rotation operation on the display surface 2*aa*, by the controller 100 controlling the display panel 120, the map displayed on the display surface 2*aa* rotates in the direction of the rotation of the fingers in the rotation operation. In this case, the map displayed on the display surface 2*aa* rotates as much as the rotation amount of the two fingers used in the rotation operation. For example, against the two points of Tokyo and Osaka of the Japanese map displayed on the display surface 2*aa*, when the user rotates the two fingers in the state where the two fingers touch the respective two points, the Japanese map on the display surface 2*aa* is rotated so that Tokyo and Osaka are positioned in the respective two points where the two fingers touch after the rotation. And, when the user performs the rotation operation further on the display surface 2*aa*, the map on the display surface 2*aa* is rotated further by the controller 100 controlling the display panel 120.

In addition, in the electronic apparatus 1 according to this embodiment, for example, by the controller 100 executing a browser in the storage module 103, when the Web site is displayed on the display surface 2*aa* of the cover panel 2, the user can significantly scroll the display on the display surface 2*aa* by repeatedly executing the slide operation on the display surface 2*aa.*

When the user performs the slide operation in the upward direction relative to the display surface 2*aa,* by the controller 100 controlling the display panel 120, the display on the display surface 2*aa* is scrolled upward as far as the moving distance of the one finger which touches the display surface 2*aa.* And, when the user further performs the slide operation in the upward direction relative to the display surface 2*aa,* by the controller 100 controlling the display panel 120, the display on the display surface 2*aa* is further scrolled upward as much as the moving distance of the on finger which touches the display surface 2*aa.*

It should be noted that the user can significantly scroll the display on the display surface 2*aa* also by repeatedly executing the flick operation on the display surface 2*aa.* In addition, also when the map is displayed on the display surface 2*aa,* the user can significantly scroll the display on the display surface 2*aa* by repeatedly executing the slide operation or the flick operation on the display surface 2*aa.*

In addition, in the electronic apparatus 1 according to this embodiment, for example, by the controller 100 executing the electronic book application in the storage module 103, when the electronic book is displayed on the display surface 2*aa,* the user can turn the pages one by one of the electronic book displayed on the display surface 2*aa* by repeatedly executing the slide operation or the flick operation on the display surface 2*aa.*

For example, when the electronic book displayed on the display surface 2*aa* is a right opening, and when the user performs the slide operation or the flick operation in the rightward direction on the display surface 2*aa,* by the controller 100 controlling the display panel 120, the display on the display surface 2*aa* moves to one next page. And, when the user performs the slide operation or the flick operation further in the rightward direction on the display surface 2*aa,* by the controller 100 controlling the display panel 120, the display on the display surface 2*aa* moves further to one next page. In addition, when the user performs the slide operation or the flick operation in the leftward direction on the display surface 2*aa,* by the controller 100 controlling the display panel 120, the display on the display surface 2*aa* moves to one previous page. And when the user performs the slide operation or the flick operation further in the leftward direction on the display surface 2*aa,* by the controller 100 controlling the display panel 120, the display on the display surface 2*aa* moves further to one previous page.

Thus, in the electronic apparatus 1 according to this embodiment, when the predetermined operation is repeatedly performed on the display surface 2*aa,* the controller 100 repeatedly executes a process corresponding to the predetermined operation by controlling the other components such as the display panel 120.

On the other hand, it is a burden for the user to perform repeatedly the operation of moving at the contact portion such as a finger in the state of touching the display surface 2*aa* (hereinafter referred to as "contact movement operation") such as the pinch operation, the slide operation, the flick operation and the rotation operation.

Thus, in the electronic apparatus 1 according to this embodiment, it is possible to re-execute the process corresponding to the contact movement operation by a simple operation of the user. In the following, this point will be described in detail.

FIG. 6 is a flowchart illustrating an example of the operation of the electronic apparatus 1 when the controller 100 is executing the map display application. As illustrated in FIG. 6, in step s1, the touch panel 130 of the detection module 150 detects the pinch-out operation on the display surface 2*aa,* the controller 100 enlarges the map displayed on the display surface 2*aa* by controlling the display panel 120. Then, in step s3, after the pinch-out operation, when the touch panel 130 detects a tap operation on the display surface 2*aa* by another finger other than the two fingers, in the state where the two fingers touch the display surface 2*aa* without being released from the display surface 2*aa,* in the positions where the two fingers which moved away from each other in the state of touching the display surface 2*aa* in the pinch-out operation complete their moving, the controller 100 determines that the tap operation is an instruction operation instructing to re-execute the process (enlarged process) corresponding to the pinch-out operation. And, in step s4, the controller 100 enlarges again the map displayed on the display surface 2*aa* by controlling the display panel 120. In this case, the map displayed on the display surface 2*aa* is enlarged by the same magnification as in step s2. In other words, the map displayed on the display surface 2*aa* is enlarged at a magnification corresponding to the increased amount of the distance between the two fingers before and after performing the pinch-out operation in step s1. Hereinafter, the instruction operation instructing to re-execute the process corresponding to the contact movement operation such as the pinch-out operation will be referred to as "re-execution instruction operation".

Then, in step s3, when the touch panel 130 detects a tap operation on the display surface 2*aa* by another finger other than the two fingers in the state where he two fingers that perform the pinch-out operation is never away from the display surface 2*aa,* the controller 100 determines the tap operation to be a re-execution instruction operation of the process corresponding to the pinch-out operation, and in step s4, enlarges the map displayed on the display surface 2*aa* again. Thereafter, the electronic apparatus 1 operates in the same manner.

Figure 7:
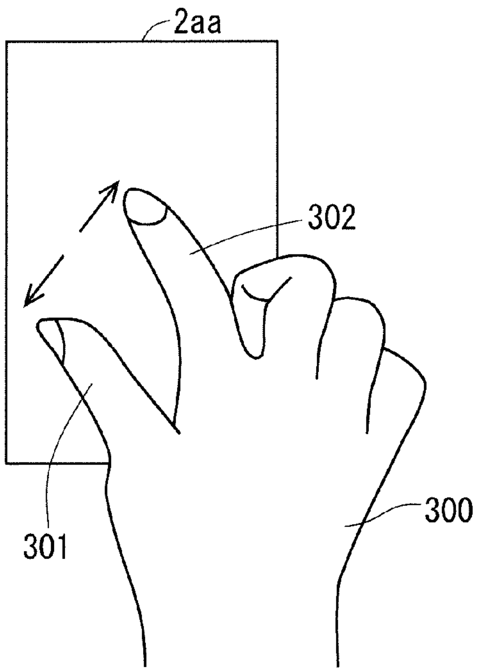
FIG. 7 illustrates a view showing an operation of a finger on the display surface of the electronic apparatus.
Figure 8:
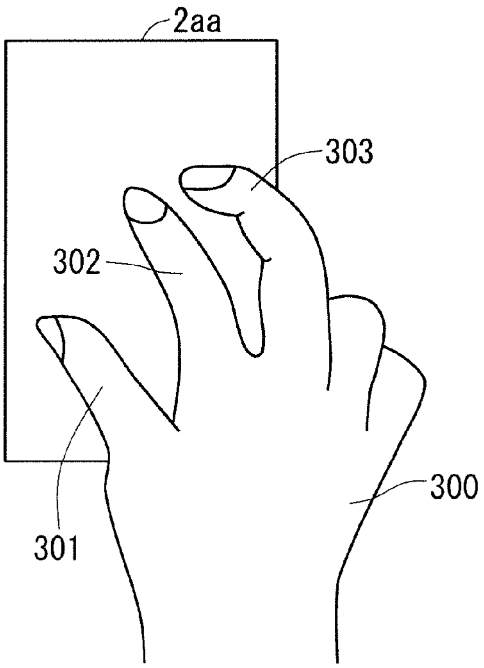
FIG. 8 illustrates a view showing an operation of a finger on the display surface of the electronic apparatus.

FIG. 7 is a view showing how the user performs the pinch-out operation on the display surface 2*aa.* FIG. 8 is a view showing how, after the pinch-out operation, the user performs the tap operation on the display surface 2*aa* with another finger other than the two fingers, in the state where the two fingers touch the display surface 2*aa* without being released from the display surface 2*aa,* in the positions where the two fingers which moved away from each other in the state of touching the display surface 2*aa* in the pinch-out operation complete their moving. In the examples shown in FIGS. 7 and 8, the user performs the pinch-out operation using the thumb 301 and the index finger 302 of the right hand 300 (FIG. 7), and then performs the tap operation with the middle finger 303 of the right hand (FIG. 8).

Thus, in this embodiment, the user can enlarge again the display on the display surface 2*aa* by performing the tap operation with another finger without releasing the two fingers that performed the pinch-out operation from the display surface 2*aa* after performing the pinch-out operation on the display surface 2*aa.* And, after performing the pinch-out operation on the display surface 2*aa,* the user can repeatedly perform the enlargement of the display on the display surface 2*aa* as many times as the tap operation is performed, by repeatedly performing the tap operation with another finger without releasing the two fingers that performed the pinch-out operation from the display surface 2*aa.*

On the other hand, as illustrated in FIG. 9, after the steps s1 and s2 described above, when the touch panel 130 detects in step s13 that at least one of the two fingers which moved away from each other in the state of touching the display surface 2_aa_ in the pinch-out operation is released from the display surface 2_aa,_ the controller 100 determines that the tap operation to be detected later by the touch panel 130 is a normal tap operation independent of the pinch-out operation, not a re-execution instruction operation of a process corresponding to the pinch-out operation. And, in step s14, when the touch panel 130 detects a tap operation on the display surface 2_aa,_ in step s15, the controller 100 performs a process corresponding to the normal tap operation without enlarging the display on the display surface 2_aa._ Here, the controller 100 performs a process configured to ignore the touch operation.

It should be noted that, when step s13 is performed after the step s4 described above is executed, that is, after the map displayed on the display surface 2_aa_ is enlarged based on the re-execution instruction operation of the process corresponding to the pinch-out operation, when it is detected by the touch panel 130 that at least one of the two fingers that performed the pinch-out operation is released from the display surface 2_aa,_ the controller 100 determines that the tap operation to be detected by the touch panel 130 later is a normal tap operation independent of the pinch-out operation, not a re-execution instruction operation of a process corresponding to the pinch-out operation. Then, when the touch panel 130 detects a tap operation on the display surface 2_aa,_ the controller 100 performs a process corresponding to the normal tap operation without enlarging the display on the display surface 2_aa._

The same applies to the pinch-in operation, and after performing a pinch-in operation on the display surface 2_aa,_ the user can reduce the display on the display surface 2_aa_ again by performing the tap operation with another finger without releasing the two fingers that performed the pinch-in operation from the display surface 2_aa._ And, after performing the pinch-in operation on the display surface 2_aa,_ the user can repeatedly perform the reduction of the display on the display surface 2_aa_ as many times as the tap operation is performed, by repeatedly performing the tap operation without releasing the two fingers that performed the pinch-in operation from the display surface 2_aa._ When the re-execution instruction operation of a process corresponding to the pinch-in operation is performed, the display on the display surface 2_aa_ is reduced at the same magnification as the reduction of the display on the display surface 2_aa_ when the pinch-in operation is performed.

FIG. 10 is a flowchart illustrating an example of the operation of the electronic apparatus 1 when the controller 100 executes the browser. As illustrated in FIG. 10, in step s21, when the touch panel 130 of the detection module 150 detects the slide operation in the upward or downward direction on the display surface 2_aa,_ in step s22, the controller 100 scrolls the display on the display surface 2_aa_ in the direction of the detected slide operation by controlling the display panel 120. Then, in step s23, after the slide operation, in a position where one finger which moved in the slide operation in the state of touching the display surface 2_aa_ completed the movement, in the state where the one finger touches the display surface 2_aa_ without being released from the display surface 2_aa,_ when the touch panel 130 detects a tap operation by another finger other than the one finger on the display surface 2_aa,_ the controller 100 determines that the tap operation is the re-execution instruction operation of the process (scroll process) corresponding to the slide operation. And, in step s24, the controller 100 scrolls the display on the display surface 2_aa_ again by controlling the display panel 120. In this case, the display on the display surface 2_aa_ scrolls in the same direction by the same amount as the scroll in step s22. In other words, along the direction of movement of one finger that performs the slide operation in step s21, the display on the display surface 2_aa_ scrolls as much as the moving distance of the one finger.

Then, in step s23, in the state where one finger that performed the slide operation is not released even once from the display surface 2_aa,_ when the touch panel 130 detects a tap operation on the display surface 2_aa_ by another finger other than the one finger, the controller 100 determines that the tap operation is a re-execution instruction operation of a process corresponding to the slide operation, and scrolls the display on the display surface 2_aa_ in step s24. Thereafter the electronic apparatus 1 operates in the same manner.

Figure 11:
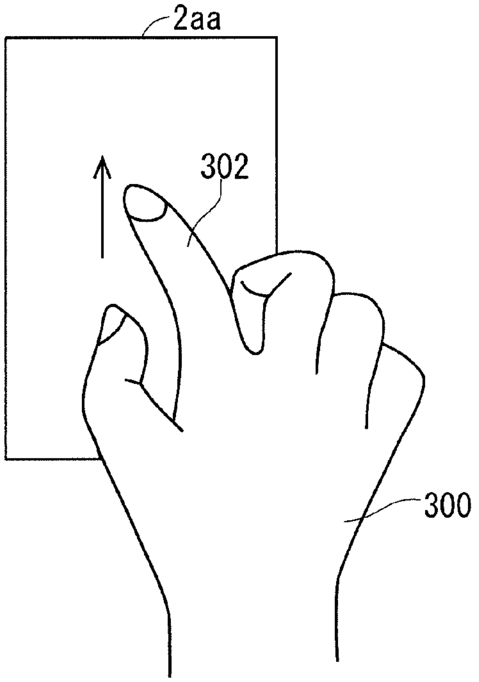
FIG. 11 illustrates a view showing an operation of a finger on the display surface of the electronic apparatus.
Figure 12:
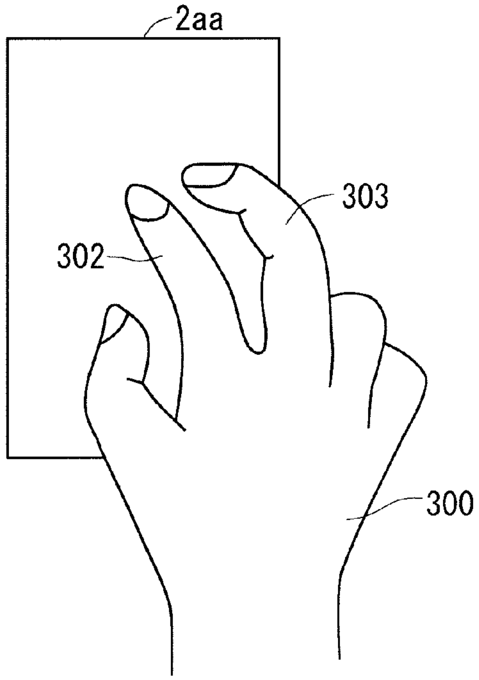
FIG. 12 illustrates a view showing an operation of a finger on the display surface of the electronic apparatus.

FIG. 11 is a view showing how the user performs the slide operation in the upward direction relative to the display surface 2_aa._ FIG. 12 is a view showing how, after the slide operation in the upward direction, the user performs the tap operation on the display surface 2_aa_ with another finger other than the one finger, in the state were the one finger touches the display surface 2_aa_ without being released from the display surface 2_aa,_ in the position where the one finger which moved in the state of touching the display surface 2_aa_ in the slide operation completes its moving. In the examples shown in FIGS. 11 and 12, the user performs the slide operation using the index finger 302 of the right hand 300 (FIG. 11), then performs the tap operation with the middle finger 303 of the right hand (FIG. 12).

Thus, in this embodiment, after performing the slide operation on the display surface 2_aa,_ the user can scroll the display on the display surface 2_aa_ again by performing the tap operation with another linger without releasing the finger that performed the slide operation from the display surface 2_aa._ And, after performing the slide operation on the display surface 2_aa_ the user can repeatedly perform scrolling display on the display surface 2_aa_ by repeatedly performing the tap operation with another finger without releasing the finger that performed the slide operation from the display surface 2_aa._

Figure 13:
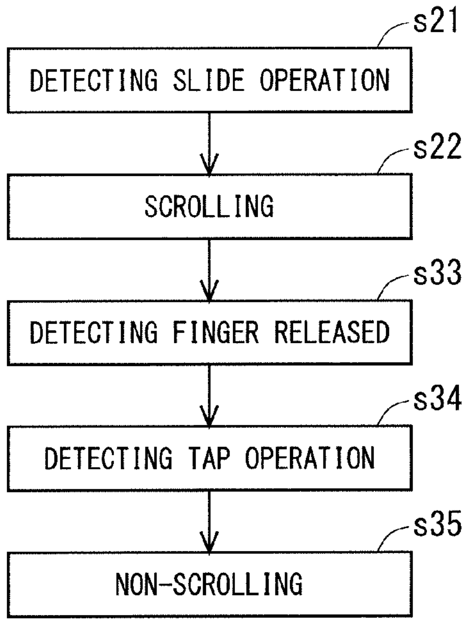
FIG. 13 illustrates a flow chart illustrating an operation of the electronic apparatus.

On the other hand, as illustrated in FIG. 13, after steps s21 and s22 described above, when the touch panel 130 detects in step s33 that one finger which moved in the state of touching the display surface 2_aa_ in the slide operation is released from the display surface 2_aa,_ the controller 100 determines that the tap operation to be detected later by the touch panel 130 is the normal tap operation independent of the slide operation, not the re-execute instruction operation of a process corresponding to the slide operation. And, in step s34, when the touch panel 130 detects a tap operation on the display surface 2_aa,_ in step s35, the controller 100 performs a process corresponding to the normal tap operation without scrolling the display on the display surface 2_aa._ Here, the controller 100 performs a process that ignores the touch operation.

It should be noted that when step s33 is executed after step s24 described above is executed, that is, after the display on the display surface 2_aa_ is scrolled based on the re-execution instruction operation of a process corresponding to the slide operation, when it is detected by the touch panel 130 that the one finger which performed the slide operation is released from the display surface 2_aa,_ the controller 100 determines that the tap operation to be detected by the touch panel 130 later is a normal tap operation which is independent of the slide operation. Then, when the touch panel 130 detects the tap operation on the display surface 2_aa,_ the controller 100 performs a process corresponding to the normal tap operation without scrolling the display on the display surface 2_aa._

In addition, the same applies to the case of rotating the display on the display surface 2_aa_ by the rotation operation, and after performing the rotation operation on the display surface 2_aa,_ the user can rotate the display on the display surface 2_aa_ again by performing the tap operation with another finger without releasing the two fingers that performed the rotation operation from the display surface 2*aa*. Then, after performing the rotation operation on the display surface 2*aa,* the user can repeatedly perform the rotation of the display on the display surface 2*aa* by repeatedly performing the tap operation with another finger without releasing the two fingers that performed the rotation operation from the display surface 2*aa*. Therefore, the user can significantly rotate the display on the display surface 2*aa* by repeatedly performing the tap operation following the rotation operation. When the re-execution instruction operation of a process corresponding to the rotation operation is performed, in the rotation direction of the display on the display surface 2*aa* when the rotation operation is performed, the display on the display surface 2*aa* is rotated as much as the rotation amount of the display on the display surface 2*aa* when the rotation operation is performed.

In addition, when the touch operation, not the tap operation, is performed after a contact movement operation such as the pinch operation, a process corresponding to the contact movement operation may be executed again. That is, the re-execution instruction operation of a process corresponding to the contact movement operation may be a touch operation. The term "touch operation" means an operation in which the finger comes in contact simply with the display surface 2*aa*. Thereby, the user can make the electronic apparatus 1 repeatedly execute a process corresponding to the contact movement operation by repeatedly performing the touch operation after the contact movement operation. In the touch operation, the finger no more moves along the surface of the electronic apparatus 1 than in the tap operation. Hereinafter, the operation of the contact portion against the electronic apparatus 1 which does not involve the movement of the contact portion along the surface of the electronic apparatus 1 such as the tap operation and the touch operation is referred to as "contact position fixed operation".

In addition, in the examples described above, to the pinch-out operation, the process of enlarging the display on the display surface 2*aa* corresponds, but another process may correspond. The same applies to the pinch-in operation, the slide operation, the flick operation, and the rotation operation, and other processes other than the processes described above may correspond.

As described above, in this embodiment, when the detection module 150 detects the contact movement operation on the display surface 2*aa,* the controller 100 performs the predetermined process corresponding to the contact movement operation. And, when the detection module 150 detects a contact position fixed operation for the electronic apparatus 1 after detecting the contact movement operation, the controller 100 re-executes the process corresponding to the contact movement operation. The contact position fixed operation such as the tap operation and the touch operation is simpler than the contact movement operation such as the pinch operation and the slide operation, and therefore, the user can re-execute the process corresponding to the contact movement operation by a simple operation. That is, the user can re-execute the process corresponding to the contact movement operation without moving the contact portion such as a finger along the surface of the electronic apparatus 1. Therefore, the operation of the electronic apparatus 1 is improved.

In addition, in this embodiment, whenever the detection module 150 detects the contact position fixed operation after detecting the contact movement operation, the controller 100 executes the predetermined process corresponding to the contact movement operation, and therefore, the user can make the controller 100 repeatedly execute the process corresponding to the contact movement operation by repeatedly performing a simple operation for the electronic apparatus 1. Therefore, the operation of the electronic apparatus 1 is further improved.

<Various Modifications>

<First Modification>

In the electronic apparatus 1 according to this modification, after the detection module 150 detects the contact movement operation in which the contact portion moves in the state of touching the display surface 2*aa,* when the detection module 150 detects the contact position fixed operation within the predetermined period of time from when the contact portion is released from the display surface 2*aa,* the controller 100 is made to re-execute the process corresponding to the contact movement operation. That is, after the detection module 150 detects the contact movement operation in which the contact portion moves in the state of touching the display surface 2*aa,* when the detection module 150 detects the contact position fixed operation within the predetermined period of time after the contact portion is released from the display surface 2*aa,* the controller 100 according to this modification determines that the contact position fixed operation is the re-execution instruction operation of the process corresponding to the contact movement operation.

Figure 14:
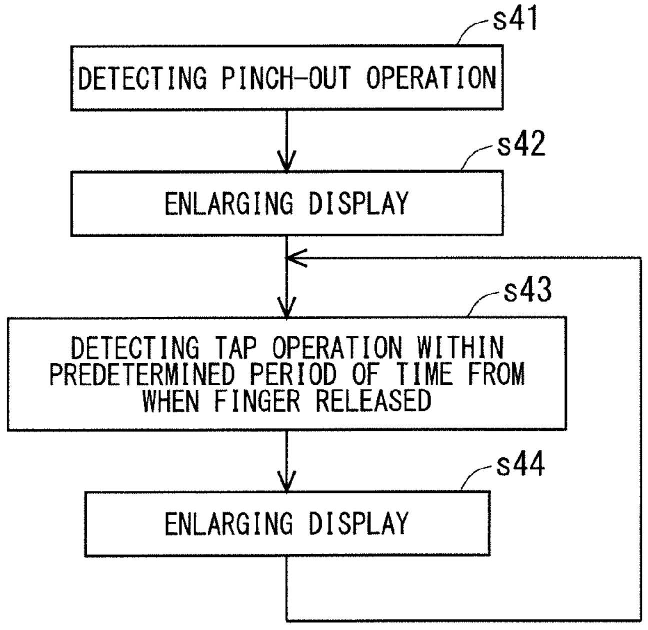
FIG. 14 illustrates a flow chart illustrating an operation of the electronic apparatus.

FIG. 14 is a diagram illustrating an example of the operation of the electronic apparatus 1 when the user enlarges the display on the display surface 2*aa* by performing the pinch-out operation according to this modification. As illustrated in FIG. 14, in step s41, when the detection module 150 detects the pinch-out operation, in step s42, the controller 100 enlarges the display on the display surface 2*aa* by controlling the display panel 120. Then, in step s43, when the detection module 150 detects the tap operation within the predetermined period of time, for example within 5 seconds, after at least one of the two fingers used in the pinch-out operation is released from the display surface 2*aa,* in step s44, the controller 100 determines that the tap operation is a re-execution instruction operation of the process corresponding to the pinch-out operation, and enlarges the display on the display surface 2*aa* again.

Then, in step s43, when the detection module 150 detects the tap operation again within the predetermined period of time from when at least one of the two fingers used in the pinch-out operation is released from the display surface 2*aa,* in step s44, the controller 100 enlarges the display on the display surface 2*aa* again. Thereafter, the electronic apparatus 1 operates in the same manner.

Thus, after performing the pinch-out operation on the display surface 2*aa,* the user releases at least one of the two fingers that performed the pinch-out operation from the display surface 2*aa,* and then performs the tap operation with any finger within the predetermined period of time, and thereby, the user can enlarge the display on the display surface 2*aa* again. And, after performing the pinch-out operation, by repeatedly performing the tap operation within the predetermined period of time after releasing it least one of the two fingers that performed the pinch-out operation from the display surface 2*aa,* the user can repeatedly perform the enlargement of the display on the display surface 2*aa* as many times as the number of times the tap operation was performed.

Figure 15:
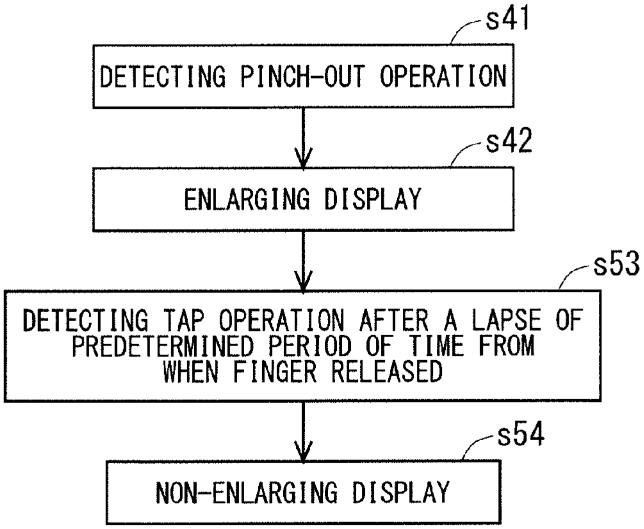
FIG. 15 illustrates a flow chart illustrating an operation of the electronic apparatus.

On the other hand, as illustrated in FIG. 15, after steps s41 and s$2 described above, in step s53, when the detection module 150 detects a tap operation after a lapse of the predetermined period of time, for example, after a lapse of 5 seconds, from when at least one of the two fingers used in the pinch-out operation is released from the display surface 2*aa,* in step s54, the controller 100 performs a process corresponding to the normal tap operation without enlarging the display on the display surface 2*aa*. Here, the controller 100 performs a process configured to ignore the touch operation.

It should be noted that, within the predetermined period of time from when at least one of the two fingers that performed the pinch-out operation is released from the display surface 2*aa*, that is, in the period in which the electronic apparatus 1 receives the instruction from the user to re-execute the process corresponding to the pinch-out operation, the controller 100 may display on the display surface 2*aa* the purport that the electronic apparatus 1 is receiving the instruction. For example, the controller 100 may display on the display surface 2*aa* a string such as "during reception". Thereby, the operability of the electronic apparatus 1 is improved.

In addition, hen step s53 is executed after steps s44 described above is executed, that is, after the display on the display surface 2*aa* is enlarged based on the re-execution instruction operation of the process corresponding to the pinch-out operation, when the tap operation is detected bye the detection module 150 after a lapse of the predetermined period of time from when at least one of the two fingers that performed the pinch out operation is released from the display surface 2*aa*, the controller 100 performs process corresponding to the normal tap operation without enlarging the display on the display surface 2*aa*.

In the examples illustrated in FIGS. 14 and 15, the re-execution instruction operation of the process corresponding to the pinch-out operation is the tap operation, and the same applies to the touch operation.

The same also applies to the case that the contact movement operation is the pinch-in operation, and when after detecting the pinch-in operation, the detection module 150 detects the tap operation (or the touch operation) within the predetermined period of time from when at least one of the two fingers that performed the pinch-in operation is released from the display surface 2*aa*, the controller 100 reduces the display on the display surface 2*aa* again. In this case, within the predetermined period of time from when at least one of the two fingers that performed the pinch-in operation is released from the display surface 2*aa*, the controller 100 reduces the display on the display surface 2*aa* every time the detection module 150 detects the tap operation (or the touch operation). On the other hand, when, after detecting the pinch-in operation, the detection module 150 detects the tap operation or the touch operation) after a lapse of the predetermined period of time from when at least one of the two fingers that performed the pinch-in operation is released from the display surface 2*aa*, the controller 100 does not reduce the display on the display surface 2*aa*.

The same also applies to the case that the contact movement operation is the rotation operation, and when, after detecting the rotation operation, the detection module 150 detects the tap operation (or the touch operation) within the predetermined period of time from when at least one of the two fingers that performed the rotation operation is released from the display surface 2*aa*, the controller 100 rotates the display on the display surface 2*aa* again. In this case, within the predetermined period of time from when at least one of the two lingers that performed the rotation operation is released from the display surface 2*aa*, the controller 100 rotates the display on the display surface 2*aa* every time the detection module 150 detects the tap operation (or the touch operation). On the other hand, when, after detecting the rotation operation, the detection module 150 detects the tap operation (or the touch operation) after a lapse of the predetermined period of time from when at least one of the two fingers that performed the rotation operation is released from the display surface 2*aa*, the controller 100 does not rotate the display on the display surface 2*aa*.

The same also applies to the case that the contact movement operation is the slide operation, and when, after detecting the slide operation, the detection module 150 detects the tap operation (or the touch operation) within the predetermined period of time from when one finger that performed the slide operation is released from the display surface 2*aa*, the controller 100 re-executes a process corresponding to the slide operation. For example, the controller 100 scrolls again the display on the display surface 2*aa*, or turn the pages displayed on the display surface 2*aa* again. In this case, within the predetermined period of time from when one finger that performed the slide operation is released from the display surface 2*aa*, the controller 100 executes a process corresponding to the slide operation every time the detection module 150 detects the tap operation (or the touch operation). On the other hand, when, after detecting the slide operation, the detection module 150 detects the tap operation (or the touch operation) after a lapse of the predetermined period of time from when one finger that performed the slide operation is released from the display surface 2*aa*, the controller 100 does not execute the process corresponding to the slide operation.

As in this modification, when, after detecting the contact movement operation configured to move in the state where the contact portion such as a finger touches the display surface 2*aa*, the detection module 150 detects the contact position fixed operation within the predetermined period of time from when the contact portion is released from the display surface 2*aa*, even when the controller 100 re-executes the process corresponding to the contact movement operation, the user re-executes the process corresponding to the contact movement operation by a simple operation. Therefore, the operation of the electronic apparatus 1 is improved.

It should be noted that, as for the flick operation, when the detection module 150 detects the flick operation, the finger that performed the flick operation is released from the display surface 2*aa*. Therefore, when the detection module 150 detects the flick operation, if the detection module 150 detects the contact position fixed operation within the predetermined period of time from the time of detecting the flick operation, the controller 100 re-executes the process corresponding to the flick operation. For example, when the detection module 150 detects the tap operation within the predetermined period of time from the time of detecting the flick operation, the controller 100 scrolls the display on the display surface 2*aa* again, or turn the pages displayed on the display surface 2*aa* again. And within the predetermined period of time from when the detection module 150 detects the flick operation, every time the detection module 150 detects the contact position fixed operation, it executes the process corresponding to the flick operation.

<Second Modification>

In the first modification described above, when the detection module 150 detects the contact position fixed operation within the first predetermined period of nine from when the contact portion that performed the contact movement operation is released from the display surface 2*aa*, the controller 100 may re-execute the process corresponding to the contact movement operation. And, when the detection module 150 detects a new contact position fixed operation within the second predetermined period of time from the time of detecting the contact position fixed operation, the controller 100 may further execute the process corresponding to the contact movement operation, in this case, when the detection module 150 detects the contact position fixed operation within the first predetermined period of time from when the contact portion that performed the contact movement operation is released from the display surface 2*aa,* the controller 100 re-executes the process corresponding to the contact movement operation, and when the detection module 150 detects a new contact position fixed operation after a lapse of the second predetermined period of time from the time of detecting the contact position fixed operation, the controller 100 does not execute the process corresponding to the contact movement operation. The first predetermined period of time and the second predetermined period of time may be the same, or may be different.

Figure 16:
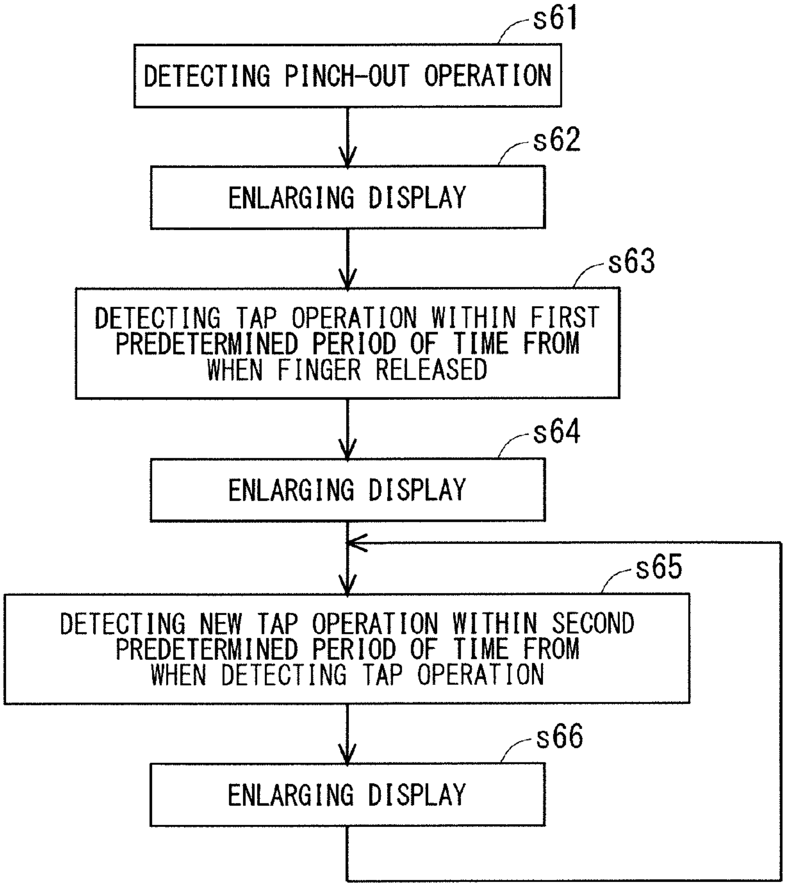
FIG. 16 illustrates a flow chart illustrating an operation of the electronic apparatus.

FIG. 16 is a diagram illustrating an example of the operation of the electronic apparatus 1 according to this modification when the user enlarges the display on the display surface 2*aa* by performing the pinch-out operation. As illustrated in FIG. 16, in step s61, when the detection module 150 detects the pinch-out operation, in step s62, the controller 100 enlarges the display on the display surface 2*aa.* Then, in step s63, when the detection module 150 detects the tap operation within the first predetermined period of time, for example, within 5 seconds from when at least one of the two fingers used in the pinch-out operation is released from the display surface 2*aa,* the controller 100 determines that the tap operation is the re-execution instruction operation of the process corresponding to the pinch-out operation, and in step s64, enlarges the display on the display surface 2*aa* again. It should be noted that the process up to this point is the same as in the first modification.

After step s64, in step s65, when the detection module 150 detects a new tap operation within the second predetermined period of time, for example, within 3 seconds from the time of detecting the tap operation in step s63, the controller 100 further enlarges the display on the display surface 2*aa* in step s66. Then, in step s65, when the detection module 150 detects a new tap operation within the second predetermined period of time from the time of detecting the previous tap operation, the controller 100 further enlarges the display on the display surface 2*aa* in step s66. Thereafter, the electronic apparatus 1 operates in the same manner.

Thus, also in this modification, after performing the pinch-out operation on the display surface 2*aa,* by releasing at least one of the two fingers that performed the pinch-out operation from the display surface 2*aa,* and then performing the tap operation with any finger within the first predetermined period of time from it, the user can enlarge the display on the display surface 2*aa* again. And, in this modification, when performing a new tap operation within the second predetermined period of time from the time of the tap operation which is a re-execution instruction operation of the process corresponding to the pinch-out operation, the user can further enlarge the display on the display surface 2*aa.*

On the other hand, as illustrated in FIG. 17, after the steps s61 to s64 described above, in step s75, when the detection module 150 detects the tap operation after a lapse of the second predetermined period of time from the time of the tap operation in step s63, in step s76, the controller 100 performs the process corresponding to the normal tap operation without enlarging the display on the display surface 2*aa.* Here, the controller 100 performs a process configured to ignore the touch operation.

It should be noted that when step s75 is executed after the step s66 described above is executed, that is, when the tap operation is detected by the detection module 150 after a lapse of the second predetermined period of time from the time of the tap operation after the display on the display surface 2*aa* is enlarged based on the tap operation which is the re-execution instruction operation of the process corresponding to the pinch-out operation, the controller 100 performs the process corresponding to the normal tap operation without enlarging the display on the display surface 2*aa.*

In addition, the same also applies to when the contact movement operation other than the pinch-out operation is performed. For example, when, after detecting the slide operation, the detection module 150 detects the tap operation within the first predetermined period of time from when the one finger performed the slide operation is released from the display surface 2*aa,* the controller 100 re-executes the process corresponding to the slide operation. And, when the detection module 150 detects a new tap operation within the second predetermined period of time from the time of the tap operation, the controller 100 further executes the process corresponding to the slide operation. In addition, the same also applies to when the re-execution instruction operation is the touch operation, not the tap operation. In addition, as for the flick operation, when the detection module 150 detects the contact position fixed operation within the first predetermined period of time from when the detection module 150 detects the flick operation, the controller 100 re-executes the process corresponding to the flick operation. And, when the detection module 150 detects a new contact position fixed operation within the second predetermined period of time from the time of detecting the contact position fixed operation, the controller 100 further executes the process corresponding to the flick operation.

<Third Modification>

In each of the embodiments described above, the operation of the contact portion against the operation button displayed on the display surface 2*aa* may be used as the re-execution instruction operation.

Figure 18:
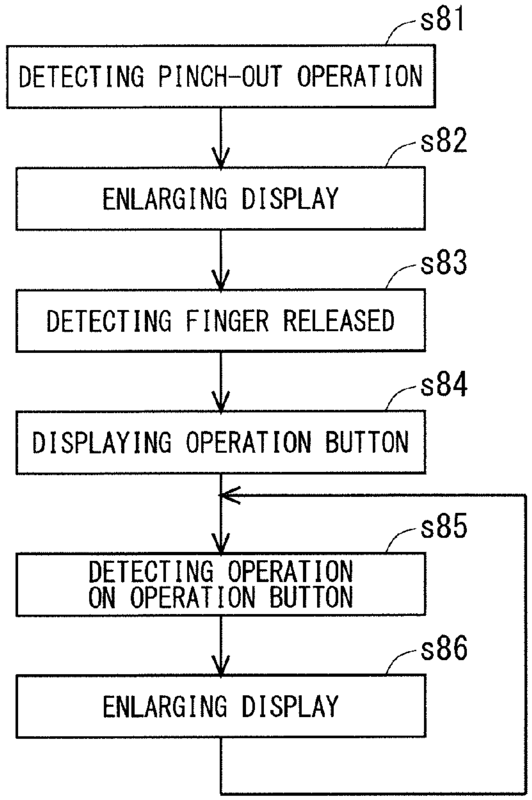
FIG. 18 illustrates a flow chart illustrating an operation of the electronic apparatus.

FIG. 18 is a diagram illustrating an example of the operation of the electronic apparatus 1 according to this modification when the user enlarges the display on the display surface 2*aa* by performing the pinch-out operation. As illustrated in FIG. 18, in step s81, when the detection module 150 detects the pinch-out operation, the controller 100 enlarges the display on the display surface 2*aa* in step s82. Then, in step s83, when the touch panel 130 of the detection module 150 detects that at least one of the two fingers used in the pinch-out operation is released from the display surface 2*aa,* in step s84, the controller 100 displays the operation button 400 for receiving the re-execution instruction operation of the process corresponding to the pinch-out operation on the display surface 2*aa* for the predetermined period of time by controlling the display panel 120.

Figure 19:
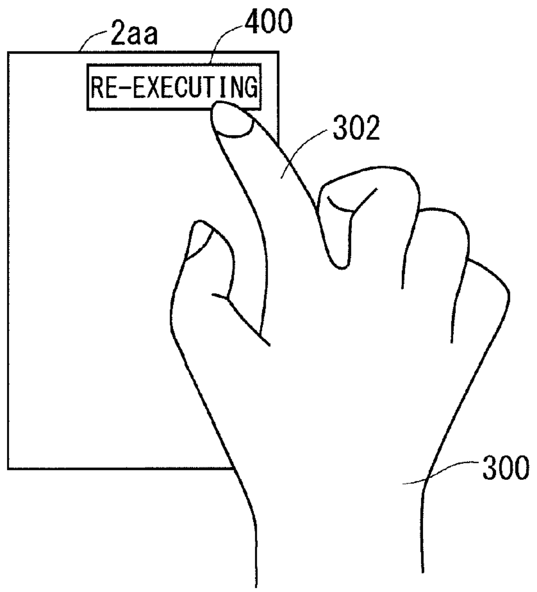
FIG. 19 illustrates a view showing an operation of a finger on the display surface of the electronic apparatus.

While the operation button 400 is displayed on the display surface 2*aa,* in step s85, when the touch panel 130 detects the finger operation on the operation button 400, the controller 100 determines that this operation is the re-execution instruction operation of the process corresponding to the pinch-out operation, and in step s86, enlarges the display on the display surface 2*aa* again. FIG. 19 is a view showing how the user operates the operation button 400 displayed on the display surface 2*aa.* In the example of FIG. 19, the user operates the operation button 400 with the index finger 302 of the right hand 300. On the operation button 400 in FIG. 19, a string "re-execution" is shown.

When the touch panel 130 detects the finger contact on the operation button 400, that is, when it detects the touch operation on the operation button 400, the controller 100 may enlarge the display on the display surface 2*aa* (a map, for example). In addition, after detecting the finger contact on the operation button 400, when the touch panel 130 detects that the finger is released from the operation button 400 at the contact position, that is, when it detects the tap operation on the operation button 400, the controller 100 may enlarge the display on the displays surface 2*aa*. The finger operation on the operation button 400 displayed on the display surface 2*aa* is a kind of the contact position fixed operation.

Then, while the operation button 400 is displayed on the display surface 2*aa*, in step s85, when the touch panel 130 detects the finger operation on the operation button 400 again, in step s86, the controller 100 enlarges the display on the display surface 2*aa* again. Thereafter, the electronic apparatus 1 operates in the same manner.

It should be noted that when the user operates with a contact module the area in the display surface 2*aa* where the operation button 400 is not displayed, the controller 100 may erase the display of the operation button 400. In addition, when the user operates the operation key 5, the controller 100 may erase the display of the operation button 400.

In addition, as in the second modification described above, when the detection module 150 detects a new finger operation on the operation button 400 within the predetermined period of time from the time of the finger operation on the operation button 400 which is a re-execution instruction operation of the process corresponding to the pinch-out operation, the controller 100 may further perform the process corresponding to the pinch-out operation.

As this modification, after the detection module 150 detects the contact movement operation, when the detection module 150 detects that the operation button 400 displayed on the display surface 2*aa* is operated by the contact module such as the finger, even when the controller 100 re-executes the process corresponding to the contact movement operation, the user can re-execute the process corresponding to the contact movement operation by a simple operation. Thus, the operability of the electronic apparatus 1 is improved.

<Fourth Modification>

Figure 20:
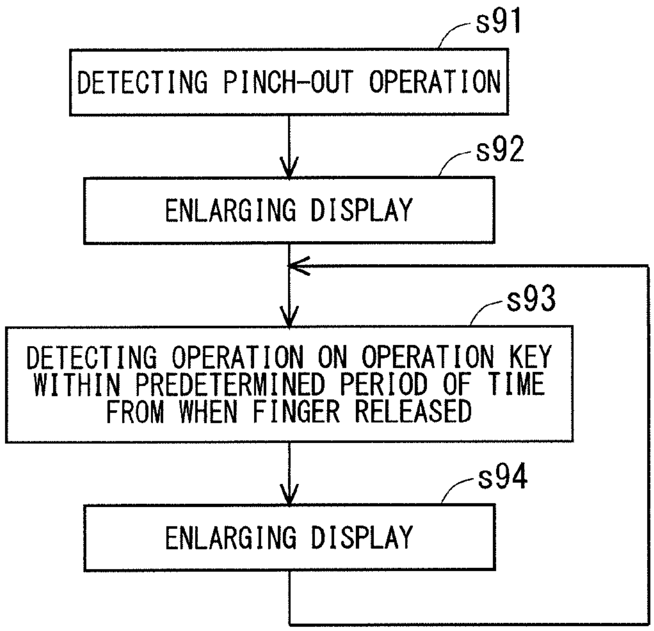
FIG. 20 illustrates a flow chart illustrating an operation of the electronic apparatus.

In each of the examples described above, the operation of the contact module against the operation key 5 may be the re-execution instruction operation. FIG. 20 is a diagram illustrating an example of the operation of the electronic apparatus 1 according to this modification when the user enlarges the display on the display surface 2*aa* by performing the pinch-out operation. As illustrated in FIG. 20 in step s91, when the detection module 150 detects the pinch-out operation, the controller 100 enlarges the display on the display surface 2*aa* in step s92. Then, in step s93, when the detection module 150 detects the finger operation on any one operation key 5 of the plurality of operation keys 5 within the predetermined period of time, for example, within 5 seconds from when at least one of the two fingers used in the pinch-out operation is released from the display surface 2*aa*, the controller 100 determines that the operation is the re-execution instruction operation of the process corresponding to the pinch-out operation, and in step s94, enlarges the display on the display surface 2*aa* again.

Then, in step s93, when the detection module 150 detects the finger operation on any one operation key 5 of the plurality of operation keys 5 within the predetermined period of time from when at least one of the two fingers used in the pinch-out operation is released from the display surface 2*aa*, in step s94, the controller 100 enlarges the display on the display surface 2*aa* again. Thereafter, the electronic apparatus 1 operates in the same manner.

Thus, after performing the pinch-out operation on the display surface 2*aa*, by releasing at least one of the two fingers that performed the pinch-out operation from the display surface 2*aa*, and then operating the operation keys 5 with any finger within the predetermined period of time, the user can enlarge the display on the display surface 2*aa* again. And, after performing the pinch-out operation, by repeatedly performing the operation on the operation key 5 within the predetermined period of time from the time of releasing at least one of the two fingers that performed the pinch-out operation from the display surface 2*aa*, the user can repeatedly perform the enlargement of the display on the display surface 2*aa* as many times as the number of times the operation is performed.

When the key operation detection module 140 of the detection module 150 detects that the operation key 5 is pushed with a finger, the controller 100 nun enlarge the display on the display surface 2*aa*. That is, when the operation signal is input from the key operation detection module 140, the controller 100 may enlarge the display on the display surface 2*aa*. In addition, after the operation key 5 is pushed by the finger, when the key operation detection module 140 detects that the operation key 5 is no longer pushed by the finger, the controller 100 may enlarge the display on the display surface 2*aa*. That is, when the operation signal for the operation key 5 is input from the key operation detection module 140, and then, the non-operation signal for the operation key 5 is input, the controller 100 may enlarge the display on the display surface 2*aa*. The finger operation on the operation keys 5 is a kind of the contact position fixed operation.

Figure 21:
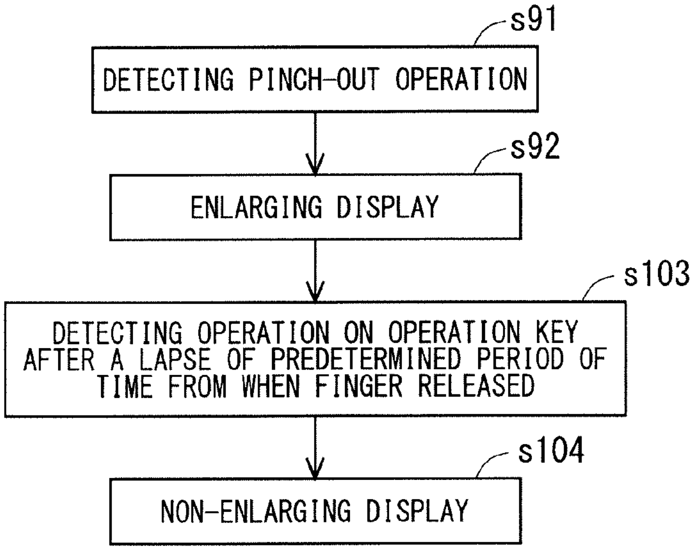
FIG. 21 illustrates a flow chart illustrating an operation of the electronic apparatus.

On the other hand, as illustrated in FIG. 21, after steps s91 and s92 described above, in step s103, after a lapse of the predetermined period of time for example, after a lapse of 5 seconds, from when at least one of the two fingers used in the pinch-out operation is released from the display surface 2*aa*, when the detection module 150 detects the finger operation on any one operation key 5 of the plurality of operation keys 5, in step s104, the controller 100 executes the normal process corresponding to the operation on the operation key 5 without enlarging the display on the display surface 2*aa*. For example, when the third operation key 5*c* is operated the controller 100 displays the option menu on the display surface 2*aa* by controlling the display panel 120.

It should be noted that, as described above, within the predetermined period of time from when at least one of the two fingers that performed the pinch-out operation is released from the display surface 2*aa*, that is, in the period in which the electronic apparatus 1 receives an instruction to re-execute the process corresponding to the pinch-out operation from the user, the controller 100 may display on the display surface 2*aa* the purport that the electronic apparatus 1 is receiving the instruction.

In addition, when step s103 is executed after step s94 described above is executed, that is, based on the finger operation on the operation key 5 Which is the re-execution instruction operation of the process corresponding to the pinch-out operation, after the display on the display surface 2*aa* is enlarged, when the finger operation on the operation key 5 is detected by the detection module 150 after a lapse of the predetermined period of time from when at least one of the two fingers that performed the pinch-out operation is released from the display surface 2*aa*, the controller 100 performs the normal process corresponding to the operation on the operation key 5 without enlarging the display on the display surface 2*aa*.

In addition, as in the second modification described above, when the detection module 150 detects a new finger operation on the operation key 5 within a predetermined period of tine from the tine of the finger operation on the operation key 5 which is the re-execution instruction operation of the process corresponding to the pinch-out operation, the controller 100 may further execute the process corresponding to the pinch-out operation.

As in this modification, after the detection module 150 detects the contact movement operation, when the detection module 150 detects the operation with the contact module such as the finger for the operation keys 5 (hardware key), even when the controller 100 re-executes the process corresponding to the contact movement operation, the user can re-execute the process corresponding to the contact movement operation by a simple operation. Therefore, the operability of the electronic apparatus 1 is improved.

<Other Modifications>

In the examples described above, although the cases in which the embodiments of the present disclosure are applied to a mobile phone are described as an example, the embodiments of the present disclosure can be applied to electronic apparatuses other than the mobile phone.

In the above description, the electronic apparatus 1 is described in detail, but the above description is the exemplification in all aspects, and the embodiments of the present disclosure are not intended to be limited thereto. In addition, the various examples described above are applicable in combination as long as they are not mutually inconsistent. And, it is construed that numerous modifications which are not exemplified can be envisaged without departing from the scope of the present disclosure.

DESCRIPTION OF THE REFERENCE NUMERAL

1: ELECTRONIC APPARATUS
2*aa:* DISPLAY SURFACE
100: CONTROLLER
150: DETECTION MODULE

The invention claimed is:

1. An electronic apparatus comprising:
a detection module configured to detect an operation for the electronic apparatus; and
a process execution module configured to execute a process corresponding to an operation detected by the detection module, wherein
when the detection module detects a first operation, the process execution module executes a predetermined process corresponding to the first operation, wherein the first operation comprises an operation in which a contact module moves in a state of touching a display surface of the electronic apparatus and
when the detection module detects a second operation after detecting the first operation, the process execution module re-executes the predetermined process, wherein the second operation comprises an operation of a contact module for the electronic apparatus without being accompanied by a movement of the contact module along a display surface.

2. The electronic apparatus according to claim 1, wherein the second operation comprises any one of an operation in which a contact module touches the display surface, an operation in which a contact module is released from the display surface at a touched position after touching the display surface, and an operation on a hardware key disposed on the electronic apparatus.

3. The electronic apparatus according to claim 2, wherein the second operation comprises an operation on an operation button displayed on the display surface of the electronic apparatus.

4. The electronic apparatus according to claim 1, wherein whenever the detection module detects the second operation after detecting the first operation, the process execution module executes the predetermined process.

5. The electronic apparatus according to claim 1, wherein
when the detection module detects the second operation in a state where a contact module touch the display snake without being released from the display surface after detecting the first operation, the process execution module re-executes the predetermined process, and
when the detection module detects the second operation in a state where a contact module is released from the display surface after detecting the first operation, the process execution module does not re-execute the predetermined process.

6. The electronic apparatus according to claim 1, wherein
when the detection module detects the second operation within a first predetermined period of time from when a contact module is released from the display surface after detecting the first operation, the process execution module re-executes the predetermined process, and
when the detection module detects the second operation after a lapse of the first predetermined period of time from when a contact module is released from the display surface after detecting the first operation, the process execution module does not re-execute the predetermined process.

7. The electronic apparatus according to claim 6, wherein
when the detection module detects the second operation within the first predetermined period of time from when a contact module is released from the display surface after detecting the first operation, the process execution module re-executes the predetermined process,
when the detection module detects the new second operation within a second predetermined period of time from the time of detecting the second operation, the process execution module further executes the predetermined process,
when the detection module detects the second operation within the first predetermined period of time from when a contact module is released from the display surface after detecting the first operation, the process execution module re-executes the predetermined process, and
when the detection module detects the new second operation after a lapse of the second predetermined period of time from the time of detecting the second operation, the process execution module does not execute the predetermined process.

8. The electronic apparatus according to claim 1, wherein the first operation comprises an operation in which two contact modules approach to each other in a state where the two contact modules touch the display surface, or an operation in which two contact modules move away from each other in a state where the two contact modules touch the display surface.

9. The electronic apparatus according to claim 8, wherein
when the first operation comprises an operation in which the two contact modules approach to each other in a state where the two contact modules touch the display surface, the predetermined process is a process configured to reduce the display on the display surface, and
when the first operation comprises an operation in which two contact modules move away from each other in a state where the two contact modules touch the display surface, the predetermined process comprises a process configured to enlarge the display on the display surface.

10. The electronic apparatus according to claim 1, wherein the first operation comprises an operation in which two contact modules rotate in a state of touching the display surface.

11. The electronic apparatus according to claim 10, wherein the predetermined process comprises a process of rotating a display on the display surface.

12. The electronic apparatus according to claim 1, wherein the first operation comprises an operation in which one contact module moves in a state of touching the display surface.

13. The electronic apparatus according to claim 12, wherein the predetermined process comprises a process configured to scroll a display on the display surface in a moving direction of a contact module in the first operation, or a process configured to turn pages displayed on the display surface.

14. The electronic apparatus according to claim 1, wherein the contact module comprises a finger.

* * * * *